US005513291A

United States Patent [19]

Buchin et al.

[11] Patent Number: 5,513,291
[45] Date of Patent: Apr. 30, 1996

[54] LIGHT SOURCE MODIFICATIONS FOR PLASTIC LIGHT FIBRE COMPATIBILITY

[75] Inventors: Michael P. Buchin, Palo Alto; Charles Gresl, Jr., San Francisco, both of Calif.

[73] Assignee: Origin Medsystems, Inc., Menlo Park, Calif.

[21] Appl. No.: 134,527

[22] Filed: Oct. 8, 1993

[51] Int. Cl.[6] .................................................. G02B 6/36
[52] U.S. Cl. ........................ 385/93; 385/89; 385/117; 385/119; 385/43; 362/32
[58] Field of Search .............................. 385/88, 89, 93, 385/119, 43, 48, 49, 31, 33, 39, 116, 117; 362/32, 293

[56] References Cited

U.S. PATENT DOCUMENTS

| 3,669,524 | 8/1970 | Shio ................................ 385/115 X |
| 3,681,164 | 3/1969 | Bainet, Jr. et al. ................. 385/115 X |
| 4,206,494 | 6/1980 | Lovering .............................. 362/32 |
| 4,523,806 | 6/1985 | Kojima et al. ....................... 385/116 X |
| 4,770,486 | 9/1988 | Wang et al. ......................... 385/93 X |
| 4,821,114 | 4/1989 | Gebhardt ............................. 385/119 X |
| 4,969,708 | 11/1990 | Leiner ................................ 385/117 |
| 5,260,815 | 11/1993 | Takizawa ............................. 359/41 |
| 5,341,275 | 8/1994 | Ghandehari .......................... 385/31 |

Primary Examiner—Rodney B. Bovernick
Assistant Examiner—Hemang Sanghavi
Attorney, Agent, or Firm—Limbach & Limbach; Alfred A. Equitz

[57] ABSTRACT

Apparatus for coupling a light beam from a light source to a light fibre with reduced heating of the light fibre. The light source has a lamp, a condenser lens, and a dichroic infra-red filter disposed along an optical axis between the lamp and the light fibre. The apparatus is adapted for operation with plastic light fibres that have a softening temperature of less than 100 degrees Celsius. The apparatus comprises light fibre connector that secures the light fibre on the optical axis. A non-visible radiation filter is located on the optical axis in a broad part of the light beam between the dichroic filter and the light fibre and reduces non-visible radiation energy remaining in the light beam following the dichroic filter. A beam restrictor is located on the optical axis adjacent to, and thermally isolated from, the light fibre connector. The beam restrictor restricts the light beam to an extent approximately equal to the extent of the light fibre and minimizes the amount of the light beam falling on the light fibre connector. This minimizes heating of the light fibre connector by the light falling on the light fibre connector. Finally, the apparatus includes an element that transfers heat from the beam restrictor for dissipation at a location thermally isolated from the light fibre connector to prevent heat resulting from the light absorbed by the beam restrictor from being transferred to the light fibre.

36 Claims, 8 Drawing Sheets

LIGHT SOURCE MODIFICATIONS FOR PLASTIC LIGHT FIBRE COMPATIBILITY

FIELD OF THE INVENTION

The invention relates to high-intensity light sources for illuminating light fibres; in particular for illuminating plastic light fibres.

BACKGROUND OF THE INVENTION

Traditionally, endoscopic imaging devices have used a bundle of glass light fibres to deliver light from a high-intensity light source to the distal end of the imaging device for illuminating the subject. More recently, plastic light fibers have been used in some devices because of advantages in material and processing costs, reliability, ruggedness and, in some cases, performance.

Figure 1:
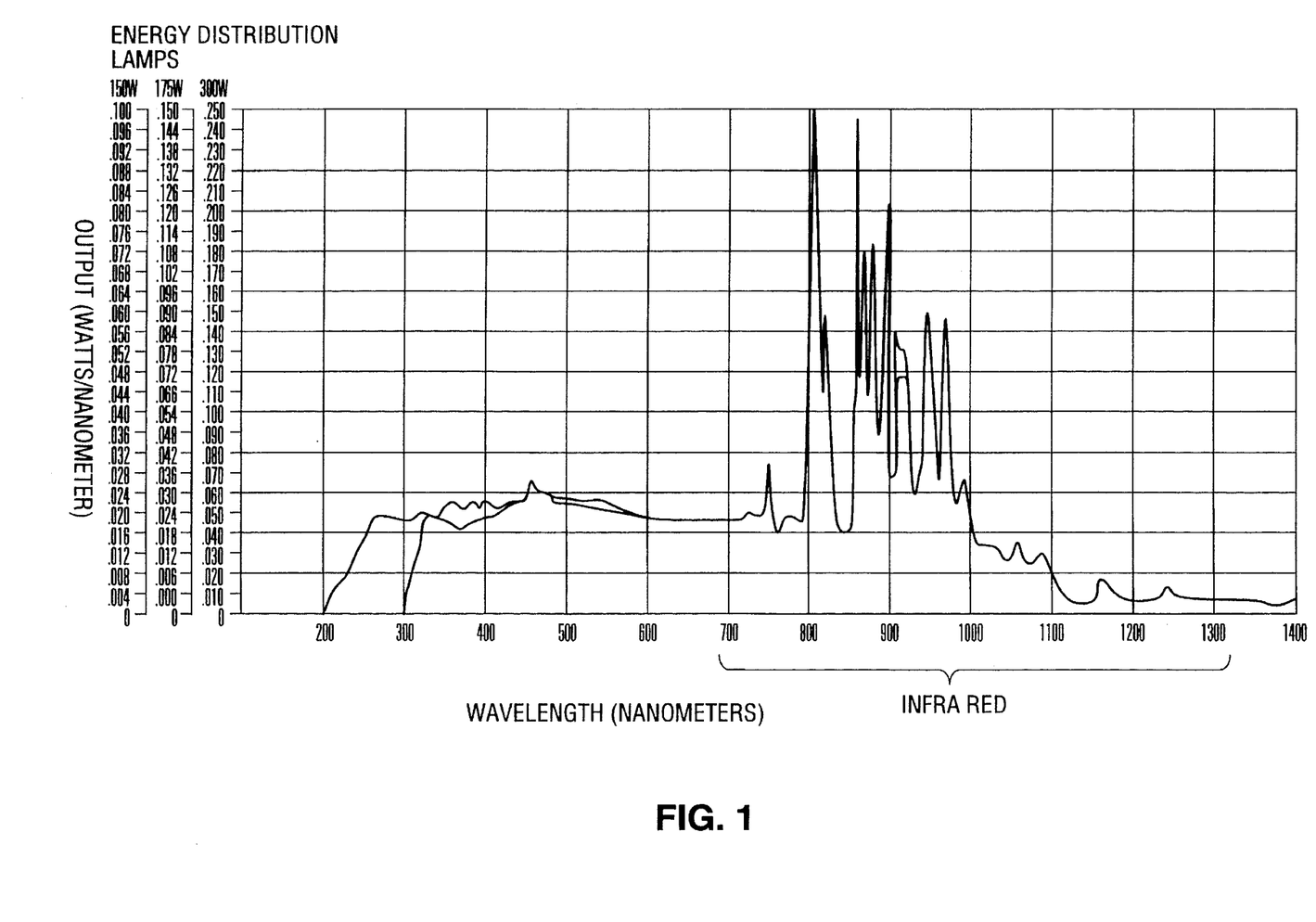
FIG. 1 shows a graph of output versus wavelength for the xenon arc lamps that are typically used as high-intensity light sources for illuminating light fibres.
Figure 2:
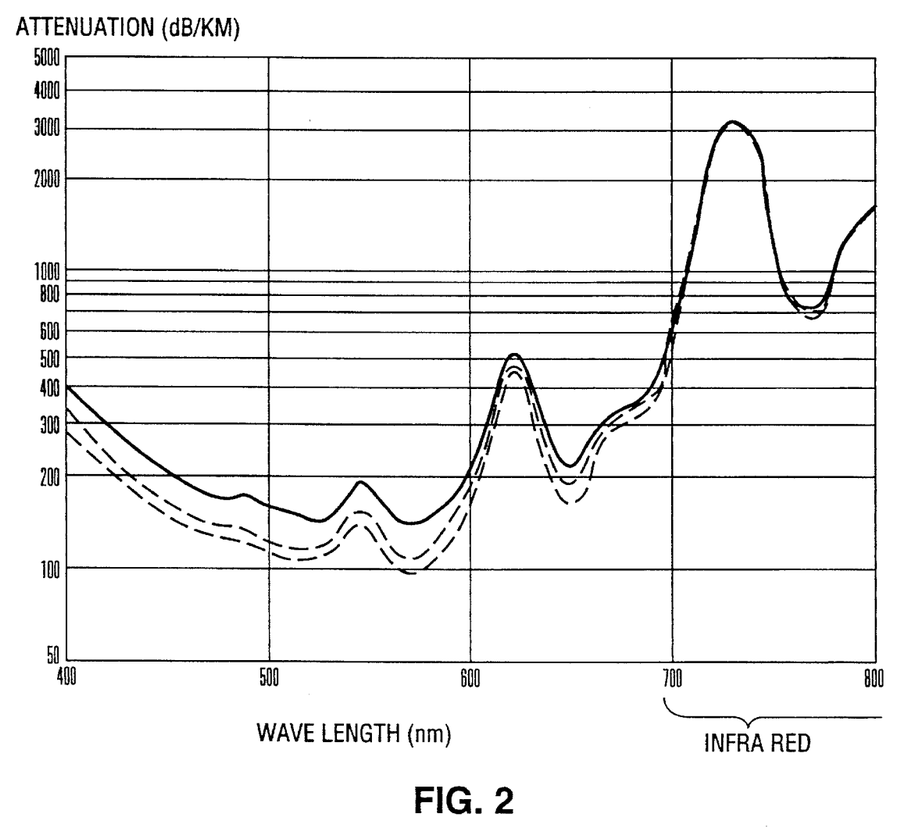
FIG. 2 shows a graph of absorption versus wavelength for high-performance plastic light fibres.

Plastic light fibres are easily damaged or destroyed if they are directly connected to most light sources for glass light fibres. Plastic light fibres typically begin to soften at 70°–80° C. The most efficient light sources used in medical endoscopy employ xenon arc lamps that are powerful emitters of non-visible energy, i.e., infra-red and ultra-violet, as shown in FIG. 1. High performance plastic light fibres are efficient transmitters in the visible region of the spectrum but are highly absorptive outside the visible region, as shown in FIG. 2. Consequently, damage to plastic light fibres directly coupled to a high-intensity light source results from the light fibres absorbing energy outside the visible region of the spectrum.

To prevent damage to plastic light fibres, known endoscopic illumination systems using plastic light fibres usually connect plastic light fibres to the high intensity light source via a light guide using glass light fibres. This arrangement reduces the likelihood of damage to the plastic light fibres because of its relatively low coupling efficiency (for example, a power loss as high as two-thirds of the incident radiation has been measured) and because the glass light fibres thermally isolate the proximal ends of the plastic light fibres from the light source. Although the interface between the distal ends of the glass light fibres and proximal ends of the plastic light fibres may still get very warm to the touch, the temperature is usually low enough to prevent damage to the plastic light fibres. The disadvantage of this arrangement is that it provides a considerably lower light output than directly coupling the plastic light fibres to the high-intensity light source.

Because of new applications requiring a small, low cost light delivery system to produce higher illumination intensities, it is highly desirable to enable plastic light fibres to be directly coupled to the high-intensity light source.

Most known direct-coupled endoscopic illumination systems contain filtering to remove infra-red energy from the output of the light source. However, the types of dichroic type filter most typically used allow significant amounts of ultra-violet and residual infra-red energy to reach the proximal ends of the light fibres. All the non-visible radiation passing through the filter is absorbed in the first few centimeters of the plastic light fibres. The resulting heat, if not conducted away, causes damage to the light fibres by the mechanisms described above.

In addition to heating by infra-red absorption by the light fibres, heat reaches the light fibres by absorption and conduction in known arrangement. The light fibres are normally attached to the light source using a metal connector. The light beam delivered to the proximal end of the light fibres by the source optics typically has a larger extent than the extent of the bundle of light fibres. Some of the stray light overspilling the light fibres falls on the material of the connector to which the light fibres are attached and on conductive material surrounding the connector. The stray light is absorbed and turned into heat that is conducted to the plastic light fibres and into the adhesive bonding the light fibres to the light fibre connector.

Finally, known arrangements use radiation-absorbent adhesives to bond the light fibres to the metal connector. The radiation (visible and invisible) absorbed by the adhesive is dissipated as heat that further contributes to the temperature rise of the light fibres.

The combination of conducted heat, heat resulting from the absorption by the light fibres of non-visible radiation, and heat resulting from absorption by the adhesive can ultimately raise the plastic light fibres to a temperature that will severely damage or destroy the plastic light fibres and the adhesive used to hold the fibres in the light fibre connector or ferrule.

OBJECTS AND SUMMARY OF THE INVENTION

It is an object of the invention to provide an apparatus for illuminating plastic light fibres in which heating of the light fibres by absorption of non-visible radiation is reduced.

It is an object of the invention to provide an apparatus for illuminating plastic light fibres in which there is reduced heating of the light fibres by conduction of heat energy resulting from the absorption of radiation by components, such as the light fibre connector, attached to the light fibre.

It is an object of the invention to provide an apparatus for illuminating plastic light fibres in which there is reduced heating of the light fibres by heat energy resulting from the absorption of radiation by the adhesive retaining the light fibres in the light fibre connector.

It is an object of the invention to provide an apparatus for coupling a light beam from an existing light source to a plastic light fibre that reduces heating of the plastic light fibre.

It is an object of the invention to provide a method for illuminating plastic light fibres in which heating of the light fibres by absorption of infrared energy is reduced.

It is an object of the invention to provide a method for illuminating plastic light fibres in which there is reduced heating of the light fibres by conduction of heat energy caused by the absorption of light energy by components, such as the light fibre connector, attached to the light fibre.

It is an object of the invention to provide a method for coupling a light beam from an existing light source to a plastic light fibre that reduces heating of the plastic light fibre.

Accordingly, the invention provides an apparatus for coupling a light beam from a light source to a light fibre with reduced heating of the light fibre. The light source comprises a lamp, a condenser lens, and a dichroic filter disposed along an optical axis between the lamp and the light fibre. The apparatus comprises a non-visible radiation filter and a light beam restrictor. The non-visible radiation filter is for reducing non-visible radiation energy in the light beam, and is disposed on the optical axis between the lamp and the light fibre. The light beam restrictor is disposed on the optical axis and restricts the light beam to an extent substantially equal to the extent of the light fibre.

The invention also provides an adaptor for coupling a light beam from a light fibre light source to a light fibre to reduce heating of the light fibre. The adaptor comprises a thermally conductive body including a coupling portion adapted for receiving light from the light fibre light source. The adaptor also includes a light fibre port to which the light fibre is connectable. The light fibre port is mounted on the body, thermally isolated from the body. The light fibre port and the coupling portion of the body define an optical axis. Finally, the adaptor includes a non-visible radiation filter and a light beam restrictor. The non-visible radiation filter reduces non-visible radiation energy in the light beam, is mounted on the optical axis in the body, and transfers heat energy to the body. The light beam restrictor restricts the light beam falling on the light fibre to an extent substantially equal to the extent of the light fibre. The light beam restrictor is mounted on the optical axis in thermal contact with the body.

The invention additionally provides a method of coupling a light beam from a light source to a light fibre with reduced heating of the light fibre. The light source comprises a lamp, a condenser lens, and a dichroic filter disposed along an optical axis between the lamp and the light fibre. In the method, non-visible radiation energy in the light beam is reduced, and the light beam is restricted to an extent similar to the extent of the light fibre.

Finally, the invention provides a method for coupling a light beam from a light fibre light source to a light fibre to reduce heating of the light fibre. In the method, an adaptor is provided that reduces non-visible radiation energy in the light beam and that restricts the light beam to an extent similar to the extent of the light fibre. The adaptor includes a light fibre port. The adaptor is inserted into the light fibre light source, and the light fibre is inserted into the light fibre port.

The adaptor may include a thermally-conductive body including a coupling portion adapted for receiving light from the light fibre light source. The light fibre port is mounted on the body, thermally isolated from the body. The light fibre port and the coupling portion of the body define an optical axis. A non-visible radiation filter is mounted on the optical axis in the body for the body to receive non-visible radiation energy from the non-visible radiation filter. Finally, a beam restrictor is mounted on the optical axis in thermal contact with the body.

DETAILED DESCRIPTION OF THE INVENTION

The invention provides a light fibre illumination source for plastic light fibres that achieves a high illumination intensity while preventing heat generated by various heating mechanisms from damaging or destroying the light fibres. The main heating mechanisms are: absorption of non-visible radiation by the light fibres; absorption of radiation by the adhesive retaining the light fibres in the light fibre connector; and absorption of radiation by the light fibre connector and other components in direct or indirect thermal contact with the light fibres.

In the light fibre illumination source according to the invention, absorption of non-visible radiation is reduced by a high-efficiency non-visible radiation filter which removes infra-red and ultra-violet energy from the output of the lamp, and provides an output in which the majority of the energy is visible light energy in the wavelength range of 400–700 nm. Absorption of radiation by the adhesive retaining the light fibres in the light fibre connector is reduced by using an adhesive that is non-absorbent in the range of wavelengths emitted by the lamp. Absorption of radiation by the light fibre connector and other components in direct or indirect thermal contact with the light fibres is reduced by an aperture arrangement that is thermally isolated from the light fibres and the light fibre connector. As an alternative to aperturing, a taper can be used to reduce heat conduction and to increase the amount of light coupled into the light fibres.

Although primarily intended to operate with plastic light fibres, the light fibre illumination source according to the invention may additionally be used with advantage with glass light fibres. Glass light fibres are less susceptible to thermal damage, but the radiation emitted by the light fibre illumination system according to the invention operating with glass light fibres (and also with plastic light fibres) is restricted substantially to visible wavelengths. Such visible light radiation is clinically preferable to radiation covering a broader range of wavelengths.

Figures 3A, 3B, 3C:
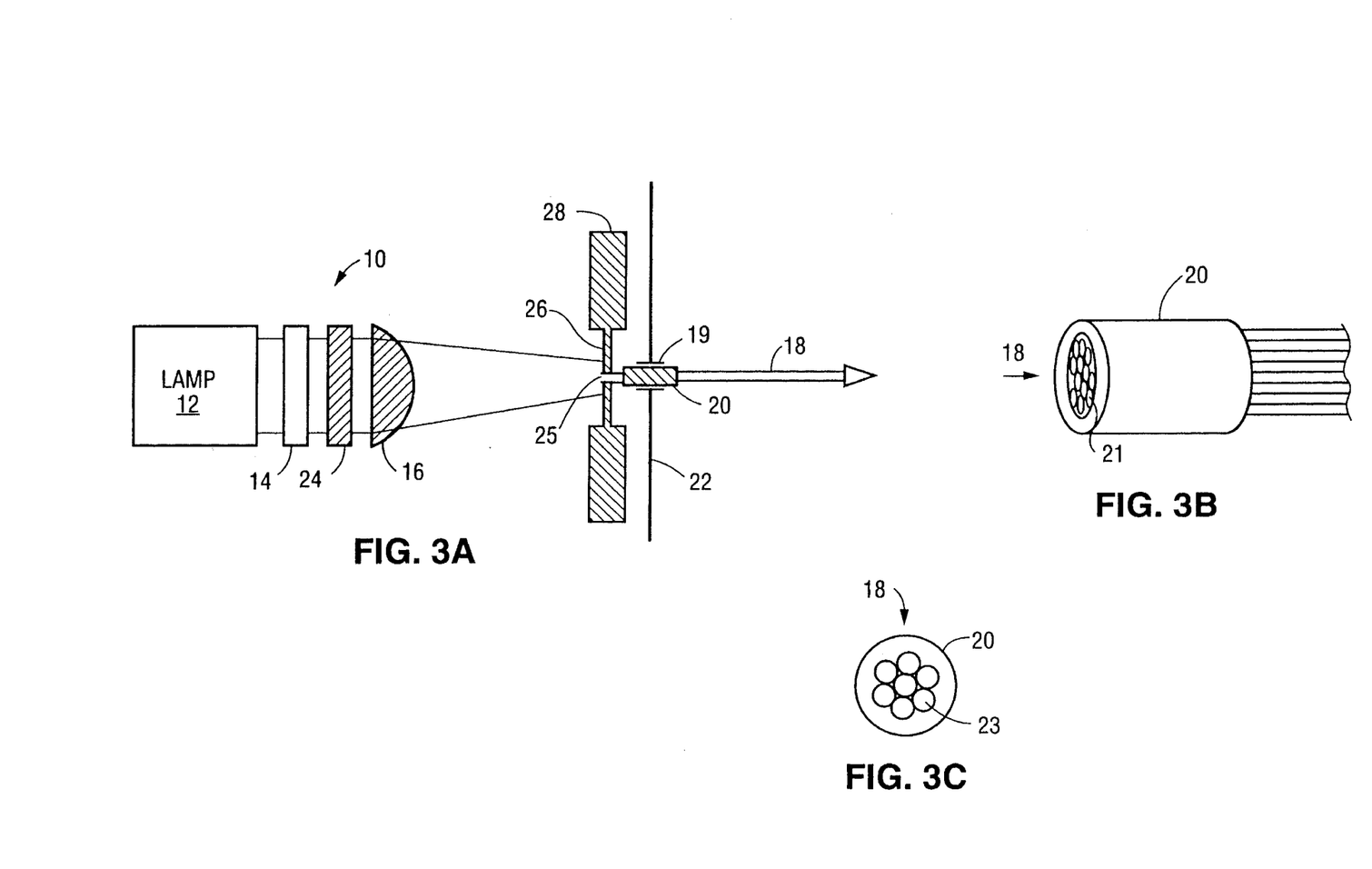
FIG. 3A shows the optical arrangement of a first embodiment of a light fibre illumination source for plastic light fibres according to the invention.
FIG. 3B shows the light fibre connector.
FIG. 3C shows a light fibre connector having a bore that is customized to the light fibres to minimize the amount of adhesive used.

The optical arrangement of the light fibre illumination source 10 according to the invention is shown in FIG. 3A. In this, the high-intensity light source 12 typically includes a xenon arc lamp (not shown). A suitable lamp is an Cermax™ xenon short arc lamp made by ILC Technology.

This lamp has an pre-aligned internal parabolic reflector that produces a beam half-angle of about 3 degrees. The lamp is connected to a suitable power supply (not shown). The radiation (i.e., visible and non-visible light) from the high-intensity light source 10 passes through the dichroic filter 14 to the condenser lens 16. Alternatively, the internal reflector in the lamp may be dichroic, in which case the external dichroic filter 14 may be omitted. The condenser lens 16 focuses the radiation from the high-intensity light source on the end of a bundle of plastic light fibres 18. The bundle of light fibres is connected to the light fibre illumination source 10 by the connector 20. Super Eska™ fibres are suitable fibres for the plastic light fibres 18.

The parts thus far described can also be found in a known light fibre illumination source. The radiation leaving the dichroic filter 14 includes considerable non-visible energy, which, when absorbed by the light fibres 18, heats the light fibres. The radiation falling on the adhesive retaining the bundle of light fibres 18 in the light fibre connector 20 is absorbed, and is turned into heat. The light fibre connector conducts this heat to the light fibres, and the conducted heat additionally contributes to heating the light fibres. The condenser lens 16 focuses the radiation (i.e., visible and non-visible light) from the high-intensity lamp 10 on the proximal ends of the light fibres. Stray radiation additionally falls on the light fibre connector 20 and the connector mounting 22 on which the light fibre connector is mounted. The light fibre connector and connector mounting absorb the stray radiation falling on them, turn the radiation into heat, and conduct the heat to the light fibres. This heat additionally contributes to heating the light fibres. With such a known arrangement, the lamp output must be reduced, or the inefficient glass fibre coupler described above must be used if plastic light fibres are to be used. Either of these measures results in the light fibre illumination system producing an unsatisfactory illumination level.

Figure 4:
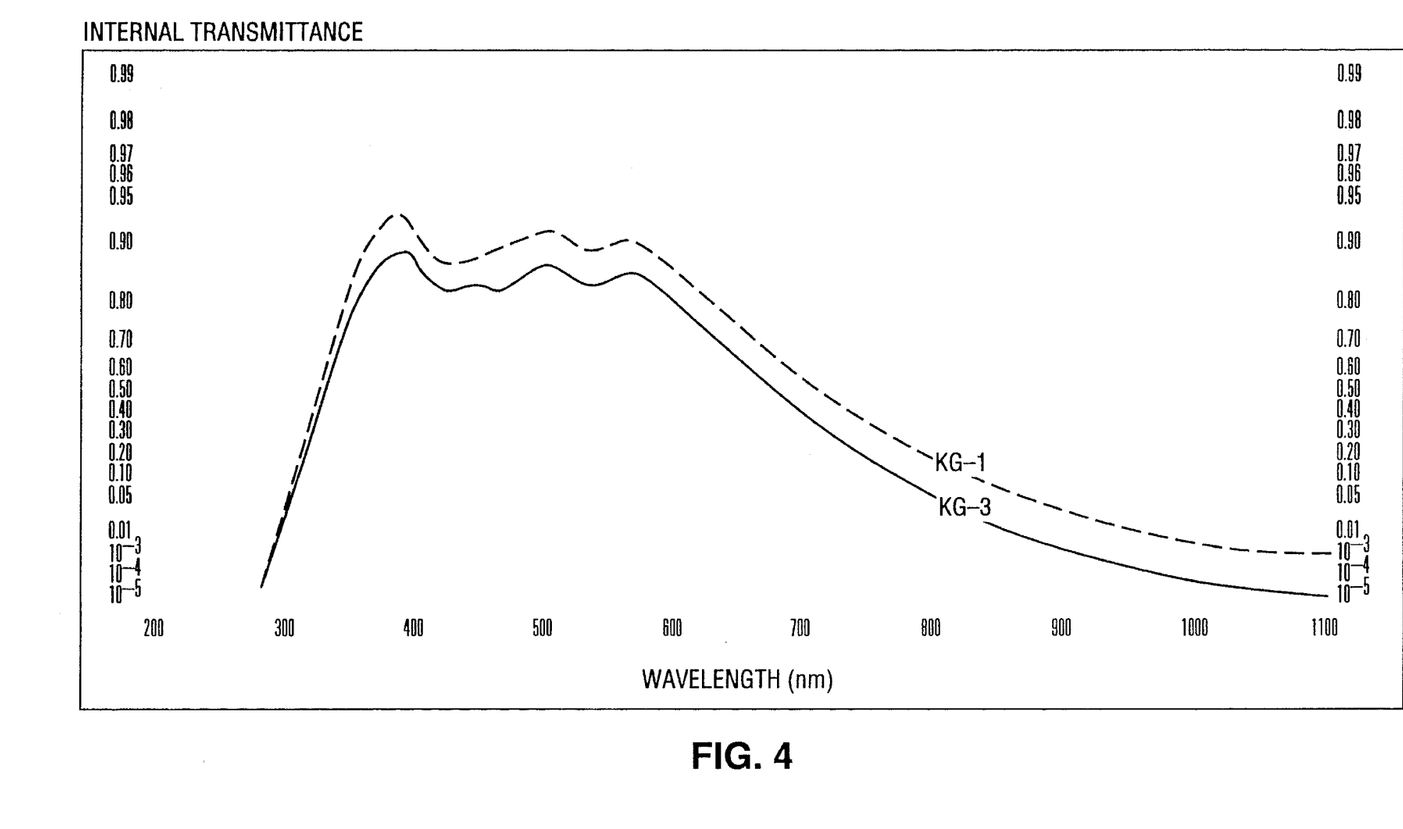
FIG. 4 shows a graph of the transmissivity vs. wavelength characteristic of the preferred non-visible radiation filter.

In the light fibre illumination source 10 according to the invention, the non-visible radiation filter 24 is placed between the dichroic filter 14 and the condenser lens 16. In the preferred embodiment, the non-visible radiation filter is a piece of a non-visible radiation absorbing glass, such as types KG-1 and KG-3 filter glass made by Schott Glass Company. The transmissivity versus wavelength characteristics of the KG-1 and KG-3 filter glass is shown in FIG. 4. A reduction by a factor of three in the residual level of infra-red radiation (λ>700 nm) passed by a typical dichroic filter has been measured in an embodiment using this type of filter glass as the non-visible radiation filter. The residual level of near infra-red radiation passed by the non-visible radiation filter 24 is insufficient to cause significant heating of the light fibres 18, even though the light fibres have a high absorption of near infra-red radiation.

If the radiation generated by the lamp 12 includes significant levels of ultra-violet radiation in addition to visible radiation and infra-red radiation, the non-visible radiation filter 24 can additionally be made ultra-violet absorbent to attenuate such radiation. The radiation beam downstream of the non-visible radiation filter 24 will be referred to as a "light beam."

The non-visible radiation filter 24 may be placed anywhere in the optical path downstream of the dichroic filter 14 and before the light fibre connector 20. However, if the non-visible radiation filter operates by absorbing radiation energy at non-visible wavelengths, and therefore heats up, the filter 24 is preferably placed at a point in the optical path where the diameter of the radiation beam is greatest, or is as large as other design constraints allow. This allows the energy absorption to be spread over a relatively large volume of the filter. In the optical arrangement shown, placing the non-visible radiation filter 24 between the dichroic filter 14 and the condenser lens 16 fulfills these requirements.

Alternative, more complex, filters that combine infra-red reflection and absorption are available from various manufacturers for use as the non-visible radiation filter 24. However, such filters may require customizing to give good color characteristics in the visible region of the spectrum, and so are less preferable than a glass filter that operates by absorption.

In the light fibre illumination source 10 according to the invention, the aperture plate 26 is placed in the light beam between the condenser lens 16 and the proximal end of the light fibres 18. The aperture plate restricts the extent of the light beam such that the extent of the light beam is similar to the extent of the bundle of light fibres in the light fibre connector. By restricting the extent of the light beam in this way, the aperture plate 26 prevents much of the light beam from spilling onto the light fibre connector 20 and the connector mounting 22. This prevents the light fibre connector and connector mounting from absorbing a significant amount of the stray light, which, in turn, prevents heat resulting from the absorption of stray light from heating the light fibres by conduction from the light fibre connector.

The size and shape of the aperture 25 is chosen so that the extent of the light beam is similar to the extent of the proximal end of the light fibres 18. For example, if the light fibres are in a circular bundle at the light fibre connector 20, the aperture 25 is made circular. Ideally, the diameter of the aperture should be chosen such that the light beam falling on the bundle of light fibres is circular with a diameter equal to that of the diameter of the bundle of light fibres. However, the aperture 25 does not cast a perfectly sharp shadow on the proximal ends of the light fibres, so if the diameter of the aperture is chosen to make the diameter of the light beam falling on the light fibres equal to the diameter of the bundle of light fibres, the resulting illumination of the light fibres will fall off towards the periphery of the bundle. To illuminate all the light fibres in the bundle uniformly, the diameter of the aperture is chosen to make the diameter of the light beam falling on the light fibres slightly larger than the diameter of the bundle of light fibres. This provides uniform illumination of all the light fibres at the cost of a small amount of light spillage onto the light fibre connector 20. For example, the aperture 25 with a diameter of about 2.5 mm mounted about 1.5 mm away from the light fibre connector 20 is used to illuminate a 1.5 mm diameter bundle of light fibres.

In the arrangement just described, stray light energy is still absorbed, and the absorbed stray light energy is turned into heat. However, nearly all of the stray light energy is absorbed by the aperture plate 26, and the amount of stray light energy absorbed by the light fibre connector 20 and the connector mounting 22 is minimized. To prevent heat reaching the light fibres 18 from the aperture plate 26, the aperture plate is thermally isolated from the light fibre connector 20. Thermal isolation is achieved by attaching the aperture plate 26 to the heat sink 28, which dissipates the heat resulting from the aperture plate absorbing the stray light.

The aperture plate 26 and heat sink 28 are mounted at some distance from the light fibre connector 20 so that the heat sink can dissipate heat at a point remote from the light fibre connector 20. This reduces conduction of heat between the aperture plate and the light fibre connector. Mounting the aperture plate and the heat sink remotely from the light fibre connector also reduces heat transfer from the aperture plate to the light fibre connector by secondary radiation.

Further reductions in heat conduction between the aperture plate 26 and the connector 20 can be achieved by including a thermal insulator in the path from the aperture plate 26 and its heat sink 28 to the light fibre connector 20. Convection cooling or some form of forced cooling, such as a fan, can alternatively or additionally be provided for the aperture plate and/or for the space between the aperture plate and the proximal ends of the light fibres.

Finally, as shown in FIG. 3B, radiation absorption by the adhesive retaining the light fibres 18 in the light fibre connector 20 is reduced by using an adhesive that is transparent to visible light is used for the adhesive 21. The adhesive 21 is also preferably transparent at other wavelengths present in the light beam falling on the proximal end of the bundle of light fibres 18. Preferred adhesives are type LCR 1.52 by ICI Resins, and Epotek 301-2.

Adhesive absorption may be further reduced by customizing the bore 23 of the connector 20 to the shape of the light fibre bundle. If few, large diameter light fibres are used, as shown in FIG. 3C, the bore of the light fibre connector 20 is formed to profile of the individual fibres. This minimizes the space that must be filled with adhesive. If many small-diameter light fibres are used, the amount of adhesive may be minimized by providing the light fibre connector 20 with a hexagonal bore. The bore of the connector is customized by extrusion, machining, or by some other forming process.

In the simple arrangement shown in FIG. 3A, there is a practical limit to the physical separation between the aperture plate 26 and the light fibre connector 20. As the distance between the aperture plate and the light fibre connector increases, the sharpness of the shadow cast by the aperture plate on the light fibre connector decreases. A less-sharp shadow requires that a choice be made between increased stray light spillage on the light fibre connector and a fall-off in illumination towards the periphery of the bundle of light fibres. Increased light spillage results in increased heating of the light fibre connector; illumination fall off results in a lower illumination level, and an impaired angular distribution of the light pattern at the distal end of the light fibre.

Figure 5:
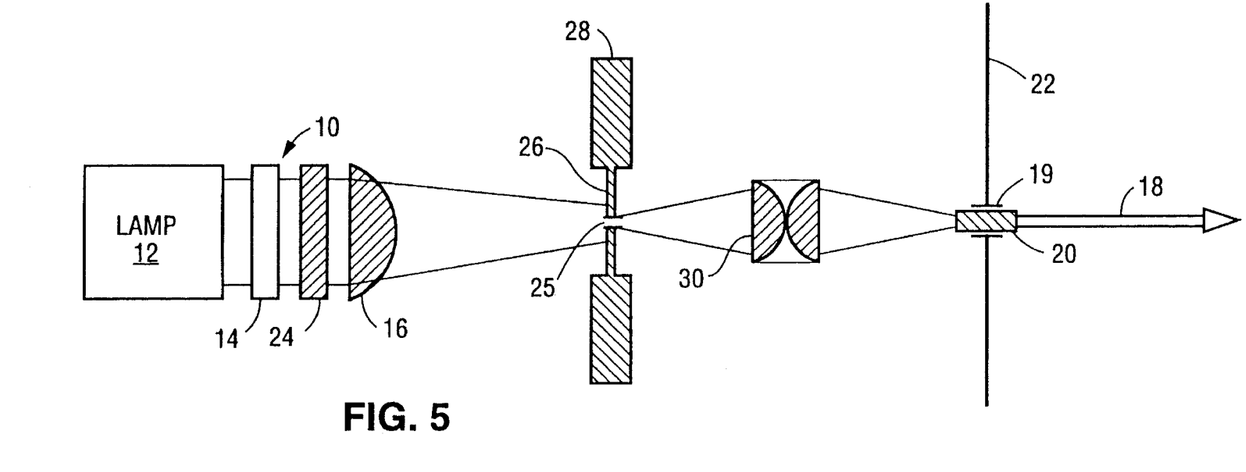
FIG. 5 shows the optical arrangement of a second embodiment of a light fibre illumination source according to the invention in which separation between the aperture plate and the light fibre connector is considerably increased while allowing the aperture plate to cast a sharp shadow on the connector.

FIG. 5 shows an arrangement in which the physical separation between the aperture plate 26 and the light fibre connector 20 is considerably increased while allowing the aperture plate to cast a sharp shadow on the light fibre connector 20. This arrangement is similar to that shown in FIG. 3A, and like components are indicated with the same reference numeral. In FIG. 5, the physical separation, and hence thermal isolation, between the aperture plate 26 and the light fibre connector 20 is increased. The relay optics 30 form a focused image of the aperture 25 on the proximal ends of the light fibres 18 and refocus the light beam diverging from the aperture on the proximal ends of the light fibres. The diameter of the aperture and the focal length of the relay optics are chosen relative to the distance between the aperture and the proximal ends of the light fibres so that the image of the aperture formed on the proximal ends of the light fibres has substantially the same extent as the bundle of light fibres.

FIG. 5 shows relay optics 30 made of two simple plano-convex lenses: a more complex lens arrangement could be used if necessary. Alternatively, a single, multi-element lens, or more than two lenses may be used. The lenses may be spherical or aspherical. If the relay optics are constructed using two or more axially-separated lenses, all or part of the non-visible radiation filter 24 may be disposed between the lenses of the relay optics 30.

Figure 6A:
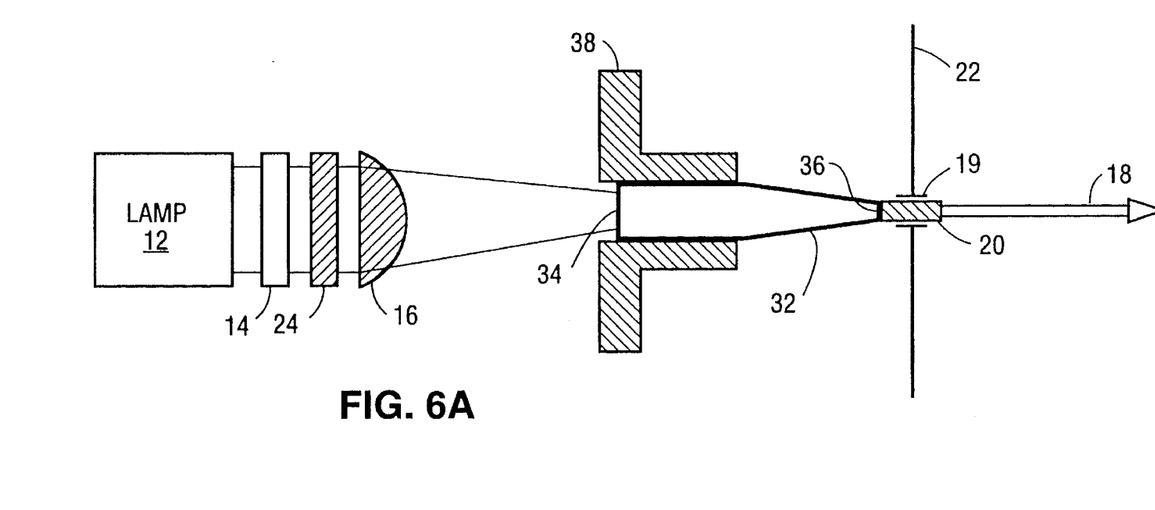
FIG. 6A shows the optical arrangement of a third embodiment of a light fibre illumination source according to the invention using a taper.

As an alternative to the aperture plate 26, the taper 32 can be added to the optical path, as shown in FIG. 6A. This arrangement is similar to that shown in FIG. 3A, and like components are indicated with the same reference numerals.

The taper 32 separates the heat source from the focal point of the light beam, homogenizes the light beam, and provides aperturing. Additionally, the taper may concentrate and condense the light beam, similarly to a wide-aperture (low f-number) focusing lens. The taper may be provided using a non-tapered glass rod, a tapered glass rod, or a fibre-glass taper. The term "taper" will be understood to apply to at least these types of tapers.

The taper 32 shown in FIG. 6A has opposed, plane, parallel faces 34 and 36. Unless the taper 32 is formed from a non-tapered glass rod, the face 34 through which light enters the taper is larger than the face 36 from which light leaves the taper. The faces 34 and 36 are normally round, as shown in FIG. 6A, but, alternatively, can be other shapes such as elliptical, square, or rectangular, or may be shaped to match the shape of the bundle of light fibres 18.

Figure 6B:
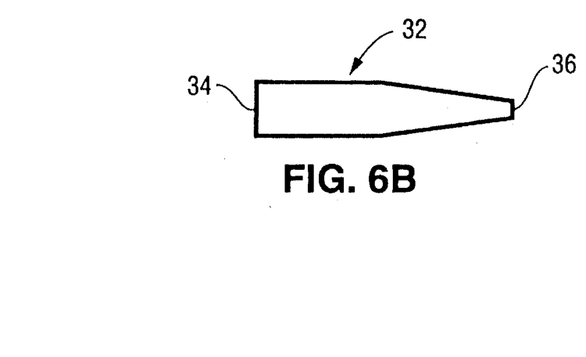
FIG. 6B shows a taper.

The taper 32 also provides a useful amount of homogenization of the light entering the larger face 34 of the taper, as shown in FIG. 6B. The light beam 31 entering the larger face 34 of the taper can have spatial irregularities 33 due to non-uniform directionality of the arc, or for other reasons. The light beam 35 leaving the taper 32 through the smaller face 36 has the homogeneous intensity profile 37. Because the taper 32 homogenizes light entering it, it can reduce ring artifacts and shading in the illumination provided by the light fibres 18 that would otherwise result from spatial irregularities in the light beam 31. Additionally, homogenizing the light beam prevents localized areas of high light intensity that can cause hot spots in the light fibres.

The smaller face 36 of the taper 32 also defines an exit aperture similar to the aperture plate 26. Hence, the taper 32 can reduce the extent of the light beam to that of the bundle of light fibres 18, and provide the benefits of aperturing described above.

The light beam from the smaller face 36 has a uniform, high intensity and can either be directly coupled into the proximal end of the plastic light fibres 18 or can be refocused through relay optics (not shown) similar to the relay optics 30 (FIG. 5) onto the proximal end of the light fibres.

The preferred embodiment uses a glass taper as the taper 32. The larger face 34 preferably has a diameter of 5 mm, and the smaller face 36 preferably has a diameter of 2.5 mm. The numerical aperture at the larger face is nominally 0.66. The glass taper 32 may be made by heating an optical glass rod to an elevated temperature, stretching the rod over at least part of the length of the rod, and polishing both ends of the rod to provide the faces 34 and 36. With a glass taper 32 having a taper ratio (i.e., the ratio of the diameter of the larger face 34 to the diameter of the smaller face 36) of between 2:1 and 3:1, a greater net light transmission to the light fibres 18 is measured using the taper than without the taper. This increased light transmission is obtained despite the insertion loss of the taper and its effective aperture.

Alternatives to using a glass taper as the taper 32 include a fibre-optic taper. A fibre-optic taper would preferably have a light fibre diameter at the larger face of about 100 μm and an open area of the light fibres of at least 80%. A fibre-optic taper produces less homogenization of the light beam than a glass taper, but is less likely to produce ring artifacts. For optimum homogenization, the fibre-optic taper should use optical fibres without an extramural absorber (EMA).

A further alternative to a glass taper as the taper 32 is a solid glass rod. A solid glass rod provides homogenization and aperturing, but not concentration and condensing. The solid rod could have a circular cross section, but could have other cross-sectional shapes, such as the shape of the bundle of light fibres.

Figure 6C:
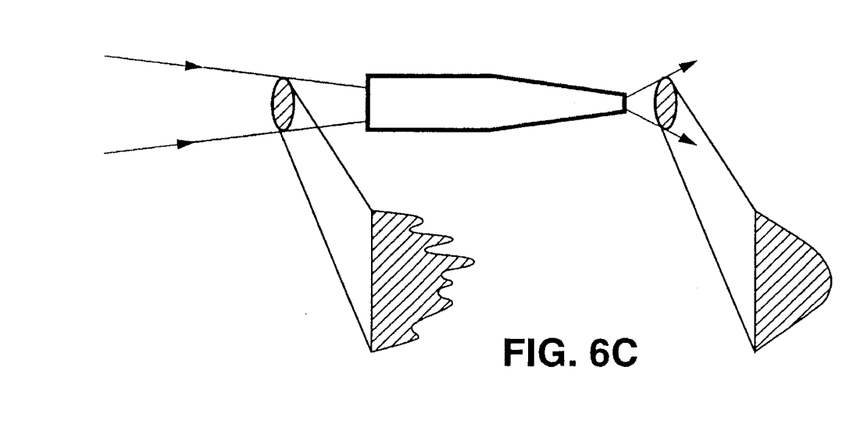
FIG. 6C shows how the taper acts as a diffusing element and has the effect of homogenizing the light entering the larger face 34 of the taper.

FIG. 6C shows the optical path of a practical embodiment of a light fibre illumination source according to the invention using the taper 32. In this arrangement, the high-intensity light source 12, dichroic filter 14, non-visible radiation filter 24, condenser lens 16, and light fibre connector 20 are the same as those described above in connection with FIG. 3A. The glass taper 32 is mounted in the heat sink 38 with its larger face 34 receiving light from the condenser lens 16, and its smaller face 36 aligned with the bundle of light fibres 18.

The taper 32 absorbs some light energy, which it turns into heat. Thus, the taper 32 is mounted in the heatsink 38 which conducts this heat to a point remote from the light fibres 18, where it dissipates this heat. This minimizes heat transfer to the light fibres, as described above. The heat sink 38 is thermally isolated from the light fibre connector 20 and the connector mounting 22, similarly to the heat sink 28 described above. However, since the glass taper concentrates the light beam, instead of absorbing part of the light beam, there is less heat to dissipate from the taper 32 than from the aperture plate 26 shown in FIG. 3A.

To minimize heat transfer between the taper 32 and the light fibres 18, an air gap is provided between the smaller face 36 of the taper and the proximal end of the light fibres. The separation between the taper and the proximal end of the light fibres is chosen relative to the respective diameters of the smaller face of the taper and the bundle of light fibres so that the extent of the illumination spot formed on the bundle of light fibres is similar to the extent of the bundle.

A thermally-isolated aperture plate, similar to the aperture plate 26, can additionally be interposed between the smaller face 36 of the taper 32 and the proximal end of the light fibres 18 to define further the extent of the light beam falling on the proximal ends of the light fibres 18.

Figure 7:
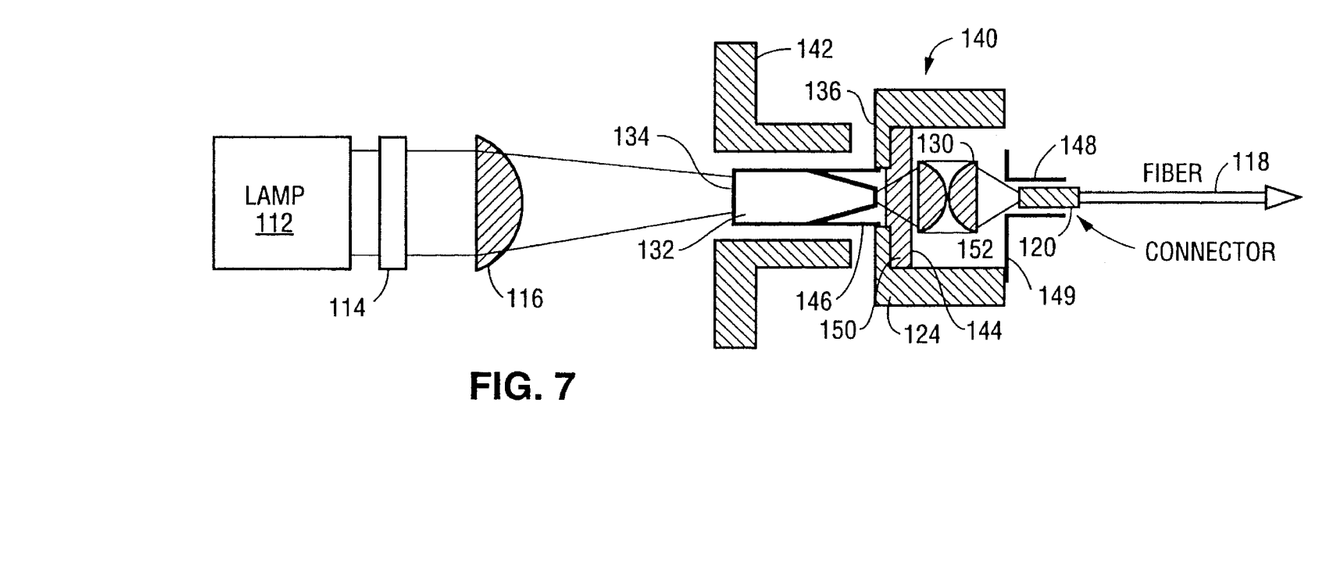
FIG. 7 shows an existing light fibre illumination source into which an adaptor according to the invention has been inserted to allow the existing source to be used with plastic light fibres.

Existing light fibre light sources can also be modified to illuminate plastic light fibres with a high intensity without the risk of damaging or destroying the light fibres. FIG. 7 shows the existing light fibre light source 110 with the high-intensity lamp 112, the dichroic filter 114 and the condenser lens 116. The existing light fibre light source also includes the light fibre port 142 to which the light fibre bundle would normally be connected by means of a suitable light fibre connector (not shown). The existing light fibre light source is unsuitable for use with plastic light fibres because of excessive levels of non-visible radiation in the radiation beam, heating of the light fibre connector by the radiation beam, and radiation absorption by the adhesive retaining the light fibres in the light fibre connector, as described above.

The plug-in converter 140 according to the invention plugs into the light fibre port 142 of the existing light fibre light source 110 to enable the existing light fibre light source to operate successfully with plastic light fibres. The plug-in converter provides non-visible radiation filtering and aperturing as in the embodiments of the invention described above. The plug-in converter is additionally be supplied with a light fibre bundle 118 and light fibre connector 120 in which the light fibre bundle is retained in the light fibre connector by a transparent adhesive, as described above. Additionally, the light fibre connector may be customized to fit the outer profile of the bundle of light fibres to minimize the amount of adhesive required, as described above.

The plug-in converter 140 includes a main body 144 having a shaped portion 146 that is shaped to plug into the light fibre port 142. Opposite the shaped portion 146, and optically aligned with the shaped portion 146, is the connector 148 that receives the light fibre connector 120 of the plastic light fibres 118. The connector 148 is preferably mounted on a portion 149 of a thermally insulating material attached to the thermally-conducting main body 144. The portion 149 minimizes heat conduction from the main body 144 to the connectors 148 and 120. The taper 132, which is preferably a glass taper, is mounted in the shaped portion 146 with its larger face 134 towards the light fibre light source 112. The fibre-optic taper 132 is similar to the fibre-optic taper 32 described above.

Light issuing from the smaller end 136 of the fibre-optic taper 132 passes through the non-visible radiation filter 124 mounted in the main body 144. The non-visible radiation filter 124 is preferably a piece of near infra-red absorbing glass, similar to the non-visible radiation filter 24 described above. Alternatively, a more complex non-visible radiation absorbing/reflecting filter can be used for the non-visible radiation filter 124, also as described above.

Because the preferred form of the non-visible radiation filter 124 absorbs a considerable amount of infra-red energy, it is mounted in the main body 144 with the face 150 of the filter in thermal contact with the face 152 of the main body 144. A layer of silicone grease or other heatsink compound is interposed between the faces 150 and 152 to ensure good thermal contact between the faces. This enables heat to pass easily from the non-visible radiation filter 124 to the main body 144, which then dissipates the heat.

Also mounted in the main body is the relay optic 130, which forms a sharply-focussed image of the smaller face 136 of the fibre-optic taper 132 on the proximal end of the light fibres 118. The size of the smaller face of the fibre-optic taper, the focal length of the relay optics, and the relative mounting positions of the fibre-optic taper, the relay optics and the proximal end of the light fibres are chosen so that the extent of the light beam falling on the proximal end of the light fibres is equal to the extent of the bundle of light fibres. This minimizes the amount of stray light filling on the light fibre connector 120, and, hence, minimizes heating of the light fibre connector 120 and the light fibres 118 by absorbed stay light.

Plugging the converter 140 into the light fibre port 142 of the existing light fibre light source 110, and plugging the light fibre connector 120 of the bundle of plastic light fibres 118 into the port 148 in the converter 140 enables the existing light fibre light source to operate with plastic light fibres without the risk of damaging or destroying them.

Figure 8A:
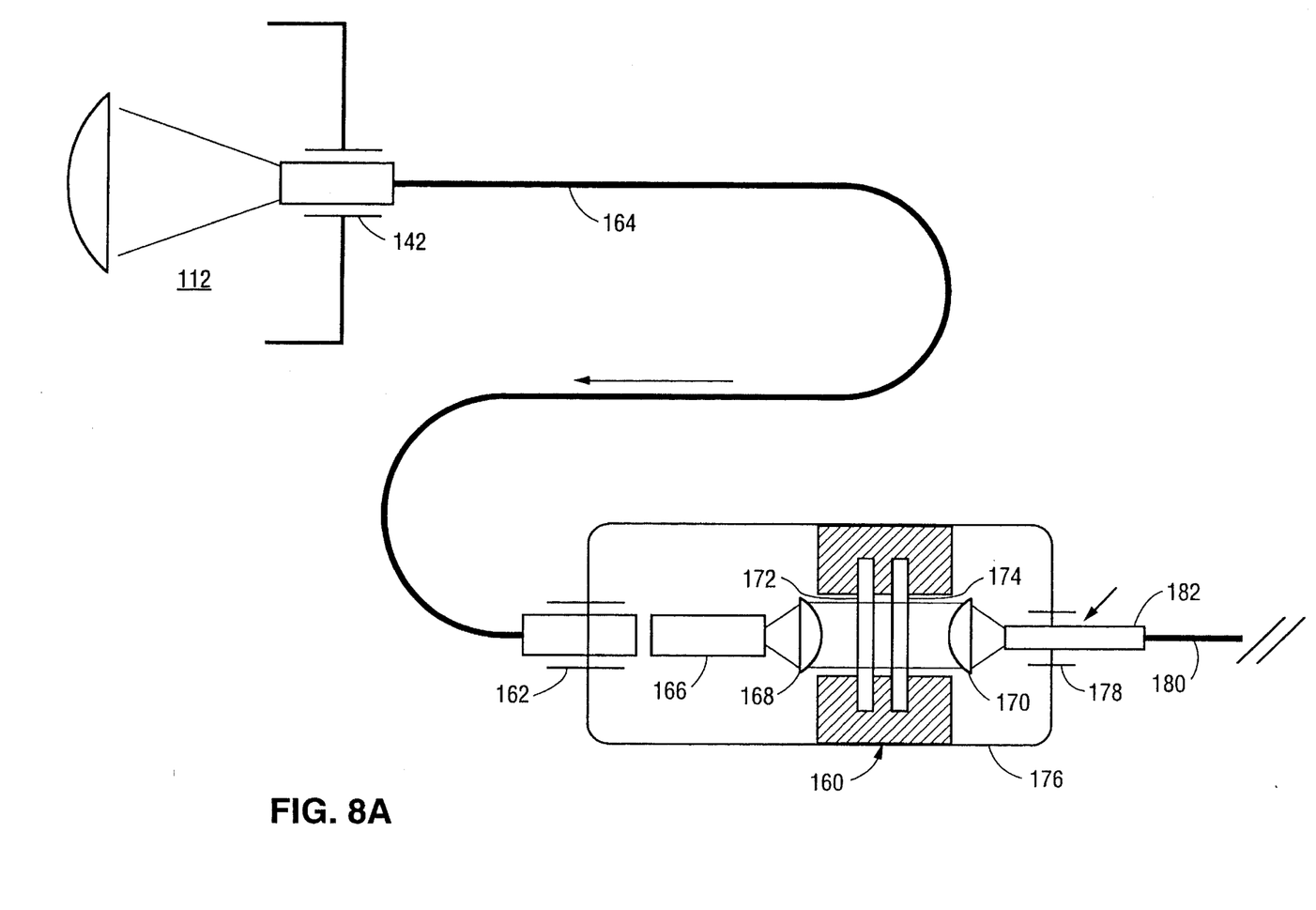
FIG. 8A shows a first embodiment of a stand-alone adaptor according to the invention that allows an existing light fibre light source to be used with plastic light fibres.
Figure 8B:
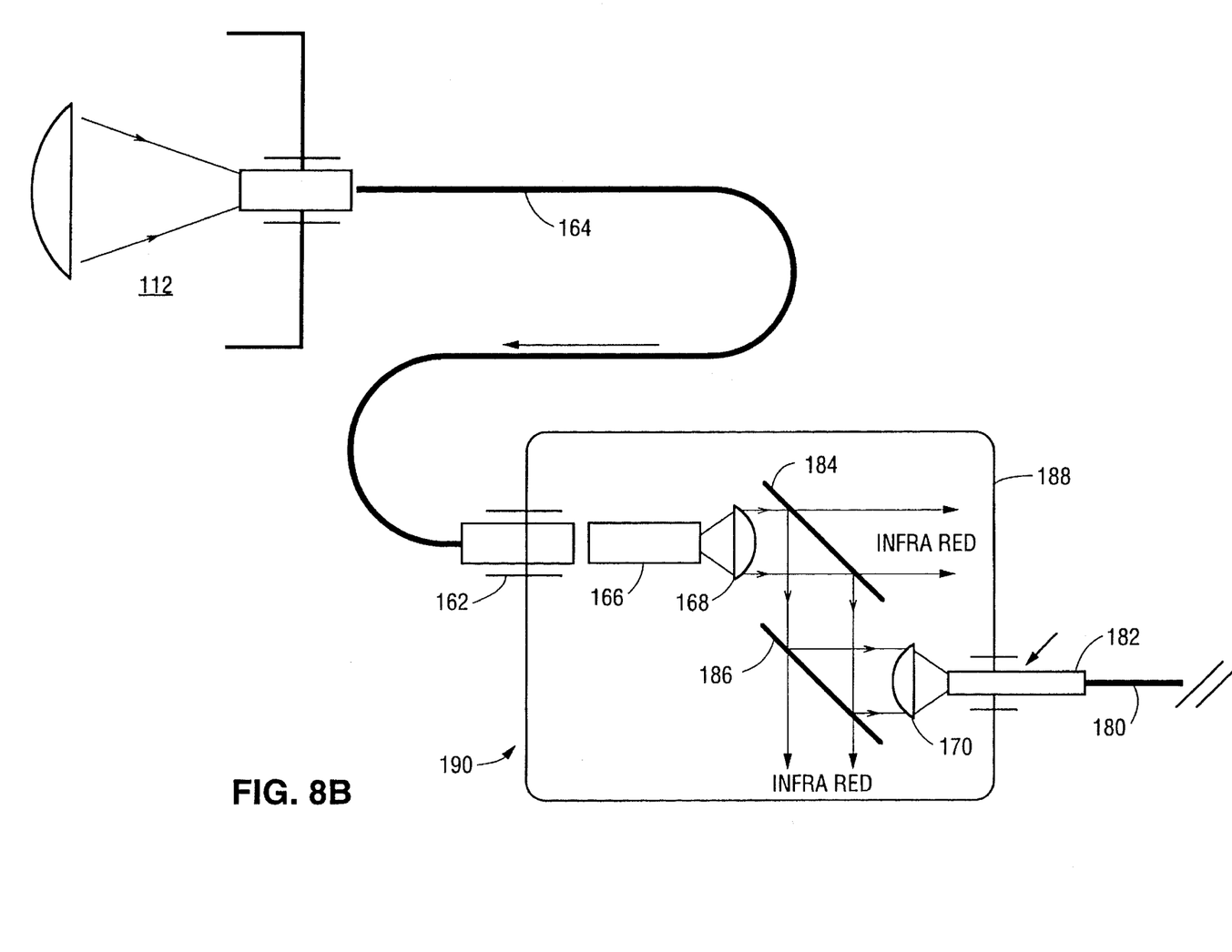
FIG. 8B shows a second embodiment of a stand-alone adaptor according to the invention that allows an existing light fibre light source to be used with plastic light fibres.

Alternatives to the converter 140 configured to plug directly into the existing light fibre light source 110 are the free-standing converters 160 and 190 shown in FIGS. 8A and 8B, respectively. The free-standing converters 160 and 190 are connected to the existing light fibre light source 112 by a suitable light coupler 162, which can be a bundle of flexible glass light fibres, or a liquid light guide. One end of the light coupler 162 is plugged into the light fibre port 142 on the existing light fibre light source 112, the other end of the light coupler is connected to the light fibre port 164 in the free-standing converter. This arrangement makes it possible to make a single, free-standing adaptor that can be connected to different models of light source simply by providing an appropriate light coupler. The existing light fibre light source can then operate with plastic light fibres without the risk of damaging or destroying them. In the preferred embodiment, the light coupler 162 is a 3 mm liquid light guide sourced by Oriel. Alternatively, a 2 mm glass fibre bundle obtainable from several different sources can be used.

The optical arrangement of the free-standing converters 160 and 180 is similar to that of the converter 140 already described, but differs in detail. The non-visible radiation filter of the free-standing converter 160 differs from that of the free standing converter 190.

Referring first to FIG. 8A, the light from the light coupler 162 first enters the taper 166. The taper 166 is similar to the taper 32 described above, so can be a non-tapered glass rod (as shown), a tapered glass rod, or a fibre-glass taper. The action of the taper 166 is the same as that of the taper 32 described above, so will not be described again here.

The homogenized and apertured light from the taper 166 enters the relay optics comprising the lenses 168 and 170. The dichroic filter 172 and the non-visible radiation filter 174 are disposed between the lenses of the relay optics to take advantage of the broadening of the beam caused by the lens 168. The actions of the dichroic filter 172 and the non-visible radiation filter 174 are the same as those of the dichroic filter 14 and the non-visible radiation filter 24 described above, so will not be described again here.

The dichroic filter 172 and the non-visible radiation filter 174 are in thermal contact with the body 176 of the free-standing adaptor 160. The body 176 dissipates heat resulting from radiation energy absorbed by these filters at a point remote from the light fiber port 178 to prevent this heat being transferred to the light fibres 180 via the light fibre connector 182. The light fibre port 178 is preferably thermally insulated from the heat-dissipating part of the body 176.

The lenses 168 and 170 of the relay optics form a sharply-focussed image of the exit pupil of the taper 162 on the ends of the light fibres 180. This sharply-focussed image minimizes the amount of light spillage onto the light fibre connector 182, and hence minimizes light absorption by the light fibre connector. The light fibre connector 182 is similar to the light fibre connector 20 described above, and is constructed to minimize the amount of adhesive bonding the light fibres to the connector. Additionally, a non-absorbent adhesive is used, also as described above. Hence the amount of light absorption is minimized, and the transfer to the light fibres of heat resulting from residual absorption is minimized.

The optical arrangement of the flee-standing adaptor 190 shown in FIG. 8B is generally similar to that of the free-standing adaptor 160, but the free-standing adaptor 190 uses as the dichroic filter and the non-visible radiation filter reflective dichroic filters disposed between the lenses 168 and 170 of the relay optics. Components corresponding to components in the free-standing adaptor 160 are marked with the same reference numerals.

Referring to FIG. 8B, the light from the light coupler 162 first enters the taper 166. The taper 166 is similar to the taper 32 described above, so can be a non-tapered glass rod (as shown), a tapered glass rod, or a fibre-glass taper. The action of the taper 166 is the same as that of the taper 32 described above, so will not be described again here.

The homogenized and apertured light from the taper 166 enters the relay optics comprising the lenses 168 and 170. The reflective dichroic filters 184 and 186 providing the dichroic filter and the non-visible radiation filter are disposed between the lenses of the relay optics to take advantage of the broadening of the beam caused by the lens 168. The reflective dichroic filters reflect visible light and transmit infra-red radiation. The transmitted infra-red radiation is absorbed by the body 188 and is dissipated at points remote from the light fibre port 178 to minimize conduction of heat to the light fibres. The light fibre port 178 is preferably thermally insulated from the heat-dissipating part of the body 176.

The lenses 168 and 170 of the relay optics form a sharply-focussed image of the exit pupil of the taper 162 on the ends of the light fibres 180. This sharply-focussed image minimizes the amount of light spillage onto the light fibre connector 182, and hence minimizes light absorption by the light fibre connector. The light fibre connector 182 is similar to the light fibre connector 20 described above, and is constructed to minimize the amount of adhesive bonding the light fibres to the connector. Additionally, a non-absorbent adhesive is used, as described above. Hence the amount of light absorption is minimized, and the transfer to the light fibres of heat resulting from residual absorption is minimized.

Although this application describes illustrative embodiments of the invention in detail, it is to be understood that the invention is not limited to the precise embodiments described, and that various modifications may be practiced within the scope of the invention defined by the appended claims.

We claim:

1. Apparatus for coupling a light beam from a light source to a light fibre with reduced heating of the light fibre, the light source comprising a lamp, a condenser lens, and a dichroic infra-red filter disposed along an optical axis between the lamp and the light fibre, the light fibre having an extent, the apparatus being adapted for operation with a plastic light fibre having a softening temperature of less than 100 degrees Celsius, the apparatus comprising:

light fibre connector means for securing the light fibre on the optical axis;

non-visible radiation filter means for reducing non-visible radiation energy remaining in the light beam, the non-visible radiation filter means being disposed on the optical axis in a broad part of the light beam between the dichroic filter and the light fibre;

restricting means for restricting the light beam to an extent approximately equal to the extent of the light fibre and for minimizing an amount of the light beam falling on the light fibre connector means, the restricting means being disposed on the optical axis adjacent to, and thermally isolated from, the light fibre connector means; and means for transferring heat from the restricting means for dissipation at a location thermally isolated from the light fibre connector means.

2. The apparatus of claim 1, wherein:

the apparatus is adapted for use with a light fibre having an infra-red absorption versus wavelength characteristic; and the non-visible radiation filter means has an infra-red absorption versus wavelength characteristic substantially similar to the infra-red absorption versus wavelength characteristic of the light fibre.

3. The apparatus of claim 1, wherein the non-visible radiation filter means comprises a piece of near infra-red absorbing glass.

4. The apparatus of claim 3, additionally comprising means for transferring heat from the piece of near infra-red absorbing glass for dissipation at a location thermally isolated from the light fibre connector means.

5. The apparatus of claim 3, wherein the piece of near infra-red absorbing glass has an infra-red absorption characteristic that progressively increases with increasing wavelength.

6. The apparatus of claim 1, wherein the non-visible radiation filter means operates by at least one of absorption and reflection.

7. The apparatus of claim 1, wherein the non-visible radiation filter means is disposed on the optical axis between the dichroic filter and the condenser lens.

8. The apparatus of claim 1, wherein:
the light beam converges towards the light fibre connector means; and
the restricting means comprises an aperture plate defining an aperture, the aperture plate being disposed adjacent to the light fibre connector means with the aperture on the optical axis, the aperture being greater in extent than the light fibre.

9. The apparatus of claim 8, wherein the means for transferring heat from the restricting means transfers the heat from the aperture plate for dissipation at the location thermally isolated from the light fibre connector means.

10. The apparatus of claim 8, wherein:
the aperture plate is located on the optical axis at a point remote from the light fibre connector means to increase thermal isolation between the aperture plate and the light fibre; and
the apparatus additionally comprises relay optic means for forming a focussed image of the aperture on the light fibre, the relay optic means being disposed on the optical axis between the aperture plate and the light fibre connector means.

11. The apparatus of claim 1, wherein the restricting means is additionally for homogenizing the light beam.

12. The apparatus of claim 11, wherein the restricting means comprises a taper having a first face and a second face, the taper being disposed on the optical axis between the light source and the light fibre connector means with the first face towards the light source and the second face adjacent the light fibre connector means.

13. The apparatus of claim 12, wherein the means for transferring heat from the restricting means transfers the heat from the taper for dissipation at the location thermally isolated from the light fibre connector means.

14. The apparatus of claim 12, wherein:
the taper is disposed on the optical axis with the second face at a point remote from the light fibre connector means to increase thermal isolation between the taper and the light fibre; and
the apparatus additionally comprises relay optic means for forming a focussed image of the second face on the light fibre, the relay optic means being disposed on the optical axis between the taper and the light fibre connector means.

15. The apparatus of claim 1, wherein the restricting means is thermally isolated from the light fibre connector means.

16. The apparatus of claim 1, additionally comprising transparent adhesive means for fixing the light fibre in the light fibre connector means, the transparent adhesive means being transparent to visible light.

17. The apparatus of claim 16, wherein:
the light fibre has an outer profile;
the light fibre connector means includes an axial bore wherein the light fibre is fixed by the transparent adhesive means;
the light fibre is fixed in the bore of the light fibre connector by a quantity of the transparent adhesive means; and
the axial bore is shaped to match the outer profile of the light fibre to minimize the quantity of the transparent adhesive means.

18. A method of coupling a light beam from a light source to a light fibre with reduced heating of the light fibre, the light source comprising a lamp, a condenser lens, and a dichroic infra-red filter disposed along an optical axis between the lamp and the light fibre, the light fibre having an extent and being secured in a light fibre connector, the method being adapted for coupling to a plastic light fibre having a softening temperature of less than 100 degrees Celsius, the method comprising steps of:
reducing non-visible radiation energy remaining in the light beam at a broad pan of the light beam between the dichroic filter and the light fibre; and
restricting the light beam at a point in the light beam adjacent the light fibre, the light beam being restricted to an extent similar to the extent of the light fibre to minimize an amount of the light beam falling on the light fibre connector; and
dissipating heat generated in the restricting step at a location thermally isolated from the light fibre.

19. The method of claim 18, wherein:
the method additionally comprises a step of providing a non-visible radiation filter and a beam restrictor;
in the step of reducing non-visible radiation energy in the light beam, the non-visible radiation energy is reduced by placing the non-visible radiation filter on the optical axis between the dichroic filter and the light fibre; and
in the step of restricting the light beam to an extent similar to the extent of the light fibre, the light beam is restricted by placing the beam restrictor on the optical axis adjacent the light fibre.

20. The method of claim 19, wherein the dissipating step includes a step of transferring the heat from the beam restrictor for dissipation at the location thermally isolated from the light fibre.

21. The method of claim 19, wherein, in the step of providing a non-visible radiation filter, an infra-red filter comprising a piece of near infra-red absorbing glass is provided.

22. The method of claim 21, wherein, in the step of reducing the non-visible radiation energy in the light beam, the piece of near infra-red absorbing glass is placed on the optical axis between the dichroic filter and the condenser lens.

23. The method of claim 21, additionally comprising a step of transferring heat from the piece of near infra-red absorbing glass for dissipation at a location thermally isolated from the light fibre.

24. The method of claim 21, wherein, in the step of providing a piece of near infra-red absorbing glass, the near infra-red absorbing glass has an infra-red absorption that progressively increases with increasing wavelength.

25. The method of claim 19, wherein the step of providing a beam restrictor includes a step of thermally isolating the beam restrictor from the light fibre connector.

26. The method of claim 18, wherein the step of reducing non-visible radiation energy in the light beam includes a step of matching a wavelength range wherein infra-red energy is reduced to a wavelength range wherein the light fibre has a greatest absorption of infra-red energy.

27. The method of claim 18, wherein the step of reducing non-visible radiation energy reduces infra-red energy by absorption and reflection.

28. The method of claim 18, wherein the step of restricting the light beam includes steps of:

provic an aperture plate, the aperture plate defining an aperture; and disposing the aperture plate adjacent to the light fibre with the aperture on the optical axis:

29. The method of claim 28, wherein the step of dissipating heat generated in the restricting step at a location thermally isolated from the light fibre includes a step of transferring the heat from the aperture plate for dissipation at the location thermally isolated from the light fibre.

30. The method of claim 28, wherein:

the method additionally comprises a step of increasing thermal isolation between the aperture plate and the light fibre by locating the aperture plate at a point on the optical axis remote from the light fibre; and the step of restricting the light beam additionally includes steps of:
providing a relay optic,
disposing the relay optic on the optical axis between the aperture plate and the light fibre, and
focusing an image of the aperture on the light fibre using the relay optic.

31. The method of claim 18, wherein, the step of restricting the light beam includes a step of homogenizing, the light beam.

32. The method of claim 31, wherein the step of restricting the light beam includes steps of:

providing a taper having a first face and a second face; and disposing the taper on the optical axis with the first face facing the light source and the second face adjacent the light fibre.

33. The method of claim 32, wherein the step of dissipating heat generated in the restricting step at a point thermally isolated from the light fibre includes a step of transferring the heat from the taper for dissipation at the location thermally isolated from the light fibre.

34. The method of claims 32, wherein:

the method additionally comprises a step of increasing thermal isolation between the taper and the light fibre by locating the taper at a point on the optical axis remote from the light fibre; and the step of restricting the light beam includes steps of:
providing a relay optic,
disposing the relay optic on the optical axis between the taper and the light fibre, and
focusing an image of the second face of the taper on the light fibre using the relay optic.

35. The method of claim 18, additionally comprising steps of:

providing a transparent adhesive, the transparent adhesive being transparent to visible light; and fixing the light fibre in the light fibre connector using the transparent adhesive.

36. The method of claim 35, wherein:

the light fibre has an outer profile;

in the step of providing a light fibre connector, a light fibre connector including an axial bore is provided;

in the fixing step, the light fibre is fixed in the bore by a quantity of the transparent adhesive; and the method additionally includes a step of minimizing the quantity of the transparent adhesive by shaping the axial bore of the light fibre connector to match the outer profile of the light fibre.

\* \* \* \* \*